H. DOOLITTLE.
Churn.

No. 38,951.

Patented June 23, 1863.

Witnesses:
James MacKay
Robert B. Gray

Inventor:
Harrison Doolittle

UNITED STATES PATENT OFFICE.

HARRISON DOOLITTLE, OF ALTON, ILLINOIS.

IMPROVEMENT IN CHURNS.

Specification forming part of Letters Patent No. 38,951, dated June 23, 1863; antedated November 3, 1862.

*To all whom it may concern:*

Be it known that I, HARRISON DOOLITTLE, of Alton, in the county of Madison, and in the State of Illinois, have invented a new and useful Improvement in Churns; and I do hereby declare the following to be a full, clear, and exact description of the same, reference being had to the annexed drawings, and the letters of reference marked thereon, making part of this specification.

The nature of my invention consists in so constructing a churn for making butter that the cream will be more thoroughly whipped and the "sac of the milk," which contains the butter, more quickly broken.

Figure 1:
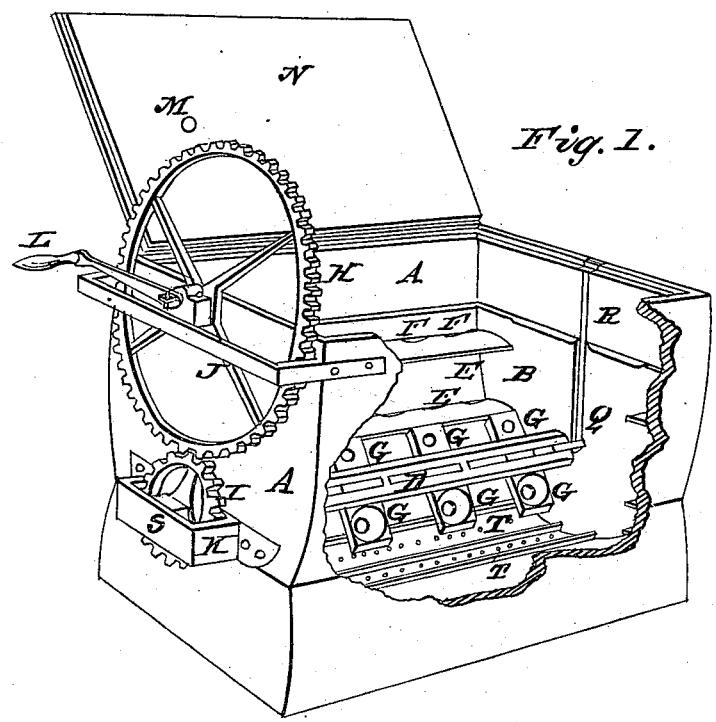
Figure 2:
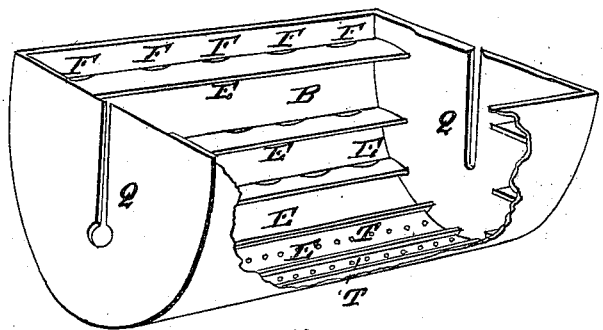
Figure 3:
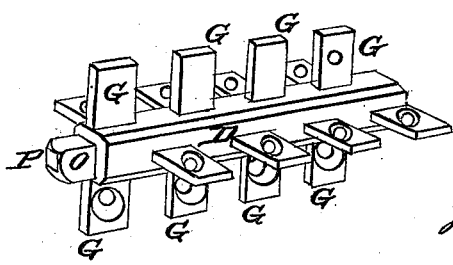

In the drawings annexed, Figure 1 is a perspective view of the churn complete, with one side of the box thereto removed to expose the inside works. Fig. 2 is a perspective representation of the tin lining or casing with one side opened also. Fig. 3 represents in perspective the dasher, the turning of which whips the cream.

I provide a lining of tin for the inside of my churn, which can be removed and cleaned as easily as a milk-pan. On the inner surface of this lining I fix the slats E, against which I throw the cream by means of the blades G, which are fixed onto the dasher-shaft D. The slats E are provided with holes F, so that cream cannot collect upon the slats and avoid the dasher.

N is the cover of the churn and shuts down like a door.

M is a hole through which any air which may be in the cream can escape.

H is a gear-wheel, which meshes into the smaller gear-wheel, I, and which is caused to revolve by means of turning the crank L.

J is a frame fastened to the body of the churn, and which forms a bearing for and supports the journal of the gear-wheel H. The gear-wheel I is similarly supported by the frame K.

S shows the end of the pinion of the gear-wheel I.

A is the box of the churn.

Q represents a slot in the lining, which allows the journal of the dasher to pass to and from its bearing.

R is a wooden key, which fits nicely into the slot Q, and holds the shaft of the dasher down at that end. This slot and key I use only at the end opposite the crank L.

B represents the surface of the lining between the slats E.

In operating my invention, the lining being placed within the churn, the cream is poured in and the cover N is closed down. Then the crank L is turned both ways as fast as is wished. The large wheel H, being so much larger than the gear-wheel I, the wheel I is made to revolve very fast. On one end of the shaft D is fixed the square ferrule O, in the end of which is a square hole, P, into which the end of the shaft of the smaller gear-wheel, I, is fitted. The revolving of the lower wheel, I, causes the dasher to revolve and thus the operation of churning is performed. As the cream is being thrown around by the dasher it comes in contact with the slats E, and is thus thrown about and agitated thoroughly. After the butter has been made the lining can be raised gradually out of the churn by first removing the key R and the dasher. It must be raised gradually, so as to allow the milk to drain out through the holes shown at T.

Having described the construction and operation of my churn, what I claim, and desire to secure by Letters Patent, as my invention, is—

The lining, Fig. 2, made of tin or zinc, when made with the slats E and the holes F and the holes T in the manner described, and for the purpose specified.

HARRISON DOOLITTLE.

Witnesses:
   JAMES MACKAY,
   ROLLIN B. GRAY.